US012728808B2

(12) United States Patent
Björklund et al.

(10) Patent No.: US 12,728,808 B2
(45) Date of Patent: Sep. 8, 2026

(54) METHOD FOR ADJUSTING A VEHICLE SETTING TO A USER, DATA PROCESSING APPARATUS, COMPUTER PROGRAM, COMPUTER-READABLE STORAGE MEDIUM, VEHICLE SETTING ADJUSTMENT SYSTEM, AND VEHICLE

(71) Applicant: Volvo Car Corporation, Gothenburg (SE)

(72) Inventors: Tomas Björklund, Gothenburg (SE); Erik Hjerpe, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 50 days.

(21) Appl. No.: 18/734,040

(22) Filed: Jun. 5, 2024

(65) Prior Publication Data

US 2024/0416856 A1 Dec. 19, 2024

(30) Foreign Application Priority Data

Jun. 15, 2023 (EP) .................................... 23179552

(51) Int. Cl.
*B60R 16/037* (2006.01)
*G01S 5/14* (2006.01)

(52) U.S. Cl.
CPC .............. *B60R 16/037* (2013.01); *G01S 5/14* (2013.01)

(58) Field of Classification Search
CPC ................ B60R 16/037; B60R 21/015; B60R 21/01538; B60R 16/0231; B60R 1/062; B60R 25/2081; G01S 5/14; B60N 2/0244; B60N 2/0273
See application file for complete search history.

(56) References Cited

U.S. PATENT DOCUMENTS

| | | | |
|---|---|---|---|
| 6,801,662 | B1 | 10/2004 | Owechko et al. |
| 9,150,123 | B2 | 10/2015 | Jendritza et al. |
| 9,919,621 | B2 | 3/2018 | Lippman et al. |
| 10,144,374 | B2 | 12/2018 | Yamasaki et al. |
| 11,117,534 | B2 | 9/2021 | Coburn et al. |

(Continued)

FOREIGN PATENT DOCUMENTS

| | | | |
|---|---|---|---|
| EP | 3822130 | A1 | 5/2021 |
| EP | 3859372 | A1 | 8/2021 |
| EP | 3875320 | A1 | 9/2021 |

OTHER PUBLICATIONS

Extended European Search Report received for European Application Serial No. 23179552.7 dated Dec. 12, 2023, 10 pages.

(Continued)

*Primary Examiner* — Kito R Robinson
*Assistant Examiner* — Tanya C Sienko
(74) *Attorney, Agent, or Firm* — Amin, Turocy & Watson, LLP

(57) ABSTRACT

The disclosure relates to adjusting a vehicle setting to a user. A corresponding method can comprise receiving, by a system comprising a processor, first data comprising a representation of the user, receiving, by the system, second data indicative of a location of a key element for a vehicle relative to the vehicle, identifying, by the system, the representation of the user in the first data by mapping the second data on the first data, and triggering, by the system, adjustment of the vehicle setting based on the representation of the user.

20 Claims, 2 Drawing Sheets

(56) References Cited

U.S. PATENT DOCUMENTS

| | | | | |
|---|---|---|---|---|
| 11,618,413 | B2 * | 4/2023 | Mukherjee | B60R 25/08 340/426.1 |
| 2017/0313270 | A1 | 11/2017 | Pena Casimiro et al. | |
| 2017/0369071 | A1 * | 12/2017 | Gould | B60R 25/24 |
| 2018/0251085 | A1 * | 9/2018 | Coburn | H04W 4/40 |
| 2018/0292506 | A1 * | 10/2018 | Bjorkengren | H04W 4/029 |
| 2021/0101546 | A1 | 4/2021 | Diamond et al. | |
| 2021/0139001 | A1 * | 5/2021 | Knutson | H04W 4/023 |

OTHER PUBLICATIONS

Ma, et al., "CarOSense: Car Occupancy Sensing with the Ultra-Wideband Keyless Infrastructure," Proc. ACM Interact. Mob. Wearable Ubiquitous Technol. 4, 3, Article 91 (Sep. 2020), 28 pages. https://doi.org/10.1145/3411820.

* cited by examiner

METHOD FOR ADJUSTING A VEHICLE SETTING TO A USER, DATA PROCESSING APPARATUS, COMPUTER PROGRAM, COMPUTER-READABLE STORAGE MEDIUM, VEHICLE SETTING ADJUSTMENT SYSTEM, AND VEHICLE

CROSS REFERENCE TO RELATED APPLICATIONS

This application claims the benefit of and priority to pending EP patent application serial number 23179552.7, filed Jun. 15, 2023, and entitled "METHOD FOR ADJUSTING A VEHICLE SETTING TO A USER, DATA PROCESSING APPARATUS, COMPUTER PROGRAM, COMPUTER-READABLE STORAGE MEDIUM, VEHICLE SETTING ADJUSTMENT SYSTEM, AND VEHICLE," the entirety of which is hereby incorporated by reference herein.

TECHNICAL FIELD

The present disclosure relates to vehicles and, more particularly, to vehicle setting adjustment.

BACKGROUND

A vehicle setting can be adjusted to a user. In this context, a position and/or configuration of a seat of the vehicle may be adjusted to a user. This means that the position and/or the configuration of the seat may be chosen as a function of a full body height of the user and/or as a function of a measure of parts of the user's body. The adjustment may be done manually. In other words, the vehicle setting may be a position and/or configuration of a seat. Another example of a vehicle setting which may be adjusted to a user is an orientation of a mirror.

SUMMARY

It is an objective of the present disclosure to further improve a user experience, e.g., in terms of comfort, when using a vehicle.

The problem is at least partially solved or alleviated by the subject matter of the independent claims of the present disclosure, wherein further examples are incorporated in the dependent claims.

The present disclosure relates to a method for adjusting a vehicle setting to a user.

Furthermore, the present disclosure is directed to a data processing apparatus, a computer program, and a computer-readable storage medium.

The present disclosure additionally relates to a vehicle setting adjustment system and to a vehicle.

According to a first aspect, there is provided a method for adjusting a vehicle setting to a user. The method comprises:

- receiving first data comprising a representation of the user,
- receiving second data indicative of a location of a key element for the vehicle relative to the vehicle,
- identifying the representation of the user in the first data by mapping the second data on the first data,
- triggering adjustment of the vehicle setting based on the representation of the user.

The representation of the user in the first data may be identified quickly and reliably using the second data. Additionally, mapping the second data on the first data is computationally efficient. Consequently, an adjustment of the vehicle setting may be triggered which is appropriate manner for the user. This enhances the user comfort. When executing the present method, it may be assumed that the user carries the key element for the vehicle. In this context, any means that is able to lock and/or unlock the vehicle is to be considered a key element. The key element may for example be a standard key fob or a smart phone with a digital key or any other electronic device configured to lock and/or unlock the vehicle. Thus, the second data may be used to identify the representation of the user in the first data. In this context, mapping the second data on the first data means identifying a portion of the first data corresponding to the second data. In other words, the first data and the second data are combined. In an example in which the first data is optical image data, mapping the second data on the first data may be imagined as marking a point or portion of the optical image data corresponding to the location of the key element. Consequently, the representation of the user in the first data may be identified with high reliability. The representation of the user is indicative of at least one characteristic of the user's body, such as a full body height or measure of parts of the user's body. Consequently, the vehicle setting may be reliably adjusted based thereon. This enhances the comfort of the user.

It is noted that the method of the present disclosure may be executed while the user is located outside the vehicle. Thus, the representation of the user may be a representation of the user associated with the user located outside the vehicle. In this context, the user is for example approaching the vehicle. Thus, the user may as well be described as a future user. This has the advantage that the adjustment of the vehicle setting may already have started or even may have been terminated when the user enters the vehicle. In other words, when the user enters the vehicle, the vehicle setting is already adjusted to the user.

The method according to the present disclosure is particularly useful if used in a fleet vehicle, e.g., a fleet car, or a rental vehicle, e.g., a rental car. Such vehicles are usually used by a wide variety of different users such that the execution of the method according to the present disclosure enhances the user comfort significantly.

In an example, the second data comprises sensor data associated with at least two detection positions on the vehicle. According to a further example, the second data comprises sensor data associated with at least three detection positions on the vehicle. It is noted that the second data is indicative of a location of a key element. In an example, the sensor data associated with each of the at least two or the at least three positions describe a detection signal strength and/or a detection direction connecting the position and the key element. Consequently, the precision and reliability are enhanced if the second data comprises sensor data associated with at least two or at least three detection positions on the vehicle.

It is noted that the sensor data associated with at least two detection positions may be two-dimensional sensor data or three-dimensional sensor data for each of the at least two detection positions. Even if two-dimensional sensor data is provided associated with each of the at least two detection positions, a location of the key element may be indicated in a three-dimensional space.

According to an example, mapping the second data on the first data comprises applying a trilateration technique and/or a triangulation technique on the sensor data associated with at least two detection positions on the vehicle. Using a trilateration technique and/or a triangulation technique provides a precise indication of a location of the key element. It is noted that applying a triangulation technique additionally requires that the sensor data comprise a directional information. Altogether, the second data may be precisely mapped on the first data.

In an example, the second data comprises radar sensor data, lidar sensor data, and/or image sensor data. Additionally, or alternatively, the first data comprises image data. The radar sensor data may be ultra-wideband sensor data. The image sensor data may alternatively be called vision sensor data. The vision sensor data may be stereo vision sensor data. In this context, the representation of the user may relate to a point cloud of radar sensor data, lidar sensor data, and/or image sensor data. In case the vision sensor data is stereo vision sensor data the representation of the user technically may be represented by two point clouds. However, these point clouds may be fused. Such data can be provided by sensors which are frequently used in vehicles, especially vehicles providing fully or partially autonomous driving functionalities. Based thereon, the method according to the present disclosure may be executed in a reliable manner.

In an example, identifying the representation of the user in the first data comprises estimating at least one detection angle associated with the representation of the user based on the received second data and a relative position between a first sensor associated with the first data and a second sensor associated with the second data. In this context, the estimated detection angle is associated with the first sensor providing the first data. In an example, the detection angle is a viewing angle, e.g., a vertical viewing angle and/or a horizontal viewing angle. Consequently, the representation of the user in the first data may be identified with high precision.

According to an example, identifying the representation of the user in the first data comprises applying an object detection technique on the first data. This is a reliable way to identify the representation of the user in the first data.

According to an example, identifying the representation of the user in the first data comprises pre-processing the first data. This means that the first data undergoes a processing step before the representation of the first user is actually identified. The processing step may comprise a quality enhancement step. Additionally, or alternatively, the processing step may comprise a coordinate transformation. In an example, the first data is image data, and the pre-processing comprises rectifying the image data. This means that distortions are eliminated. The purpose of the pre-processing is to facilitate the identification of the representation of the user. This includes enhancing the quality and precision of the identification of the representation of the user. Based thereon, the identification of the representation of the user is improved.

In an example, the method further comprises estimating a body characteristic of the user based on the identified representation of the user, and triggering adjustment of the vehicle setting based on the estimated body characteristic. Consequently, the vehicle setting may be precisely adjusted to the user's needs.

In an example, the body characteristic comprises one or more of a full body height of the user, an upper body height of the user, a full leg length of the user, a thigh length of the user, a lower leg length of the user, or a body weight of the user. In this context, a full leg length is measured from the user's feet to the user's hips. A thigh length is measured from the user's knees to the user's hips. A lower leg length is measured from the user's feet to the user's knees. All of these body characteristics may be addressed by vehicle settings, e.g., seat settings. If the vehicle settings are adjusted to all or some of these body characteristics, the comfort for the user is enhanced.

In an example, the vehicle setting is one or more of an airbag setting, a seat belt setting, a seat setting or a mirror setting. The airbag setting may relate to an inflation volume, inflation timing, expansion power, and/or explosion power. The seat belt setting may relate to a height of an attachment point on the B pillar. The seat setting may relate to a position and/or configuration of a seat. The mirror setting may relate to an orientation of the mirror. These settings influence the comfort of a user of the vehicle. Thus, by adjusting these settings to the user, user comfort is enhanced.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a data processing apparatus comprising means for carrying out the method of the present disclosure. Thus, using such a data processing apparatus, a vehicle setting may be reliably adjusted to a user of the vehicle. This enhances the comfort of the user.

According to a third aspect, there is provided a computer program comprising instructions which, when the computer program is executed by a computer, cause the computer to carry out the method of the present disclosure. Thus, using such a computer program, a vehicle setting may be reliably adjusted to a user of the vehicle. This enhances the comfort of the user.

According to a fourth aspect, there is provided a computer-readable storage medium comprising instructions which, when executed by a computer, cause the computer to carry out the method of the present disclosure. Thus, using such a computer-readable storage medium, a vehicle setting may be reliably adjusted to a user of the vehicle. This enhances the comfort of the user.

According to a fifth aspect, there is provided a vehicle setting adjustment system. The vehicle setting adjustment system comprises at least one first sensor configured for providing first data comprising a representation of a user, at least one second sensor configured for providing second data indicative of a location of a key element for the vehicle, an actuator unit configured for adjusting the vehicle setting, and a data processing apparatus according to the present disclosure, wherein the data processing apparatus is communicatively connected to the at least one first sensor, the at least one second sensor and the actuator unit. As before, it is assumed that the user carries the key element for the vehicle. Again, any means that is able to lock and/or unlock the vehicle is to be considered a key element. The key element may for example be a standard key fob or a smart phone with a digital key or any other electronic device configured to unlock the vehicle. Thus, using the second sensor, a reliable indication of the location of the key element may be provided. Using the first sensor, first data comprising a representation of the user is provided in a reliable manner. The combination of the first sensor, the second sensor and the data processing apparatus are, thus, able to precisely identify a representation of the user. The representation of the user is indicative of at least one characteristic of the user's body, such as the full body height or measure of parts of the user's body. Thus, a vehicle setting may be reliably adjusted using the data processing apparatus and the actuator unit. This enhances the comfort of the user.

In an example, the first sensor comprises an image sensor and/or the second sensor comprises one or more of a radar sensor, a lidar sensor or an image sensor. The radar sensor may be an ultra-wideband sensor. The image sensor may alternatively be called a vision sensor. The vision sensor may be a stereo vision sensor. Such sensors are precise and reliable. Based on the data provided by the sensors, the vehicle setting may be reliably and appropriately adjusted.

In an example, the first sensor is formed by an optical camera. Also, the second sensor may be formed by an optical camera.

According to a sixth aspect, there is provided a vehicle comprising the data processing apparatus according to the present disclosure or the vehicle setting adjustment system according to the present disclosure. In such a vehicle, a vehicle setting may be reliably adjusted to a user. This enhances the comfort of the user.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The Figures are merely schematic representations and serve only to illustrate examples of the disclosure. Identical or equivalent elements are in principle provided with the same reference signs.

Figure 1:
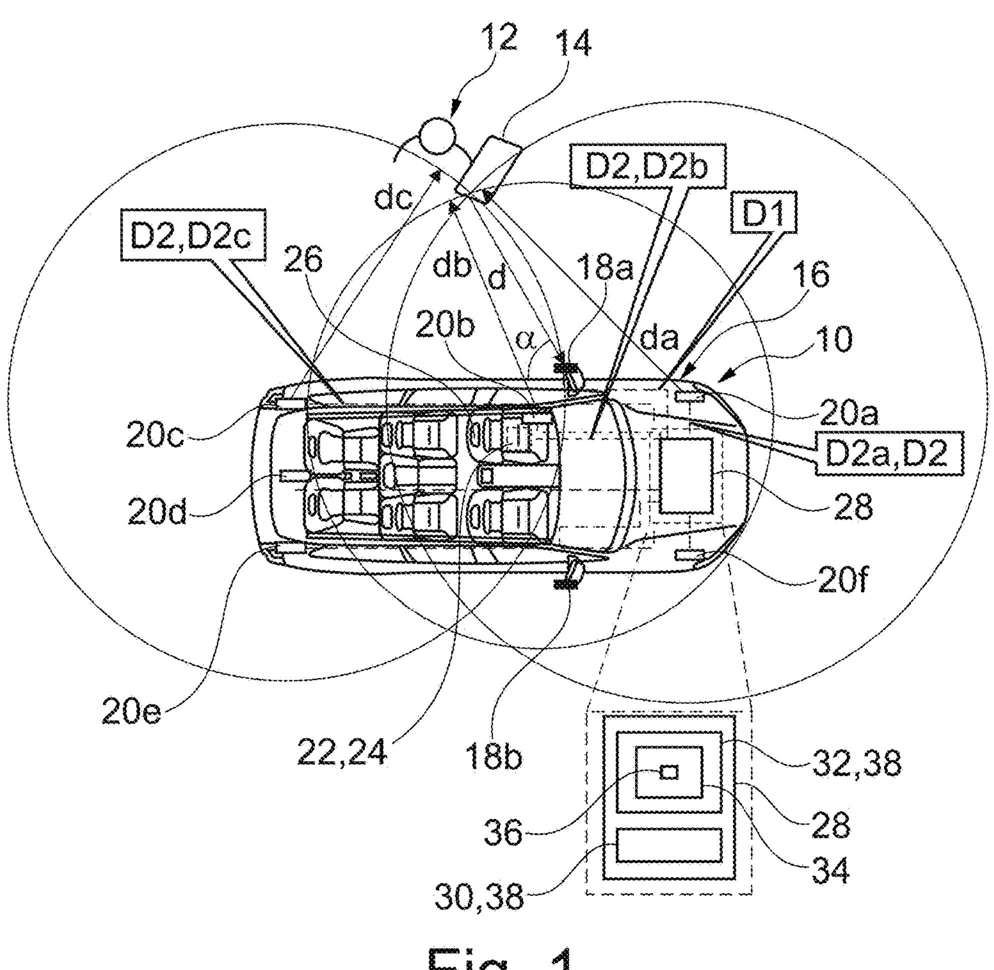
FIG. 1 shows a vehicle according to the present disclosure comprising a vehicle setting adjustment system according to the present disclosure, a data processing apparatus according to the present disclosure, a computer program according to the present disclosure and a computer-readable storage medium according to the present disclosure, wherein a method according to the present disclosure for adjusting a vehicle setting to a user may be executed by the vehicle.

FIG. 1 shows a vehicle 10.

Moreover, FIG. 1 shows a user 12 carrying a key element 14. The user 12 is approaching the vehicle 10.

The vehicle 10 comprises a vehicle setting adjustment system 16.

In the present example, the vehicle setting adjustment system 16 comprises two first sensors 18*a*, 18*b* which comprise image sensors formed as optical cameras. The two first sensors 18*a*, 18*b* are arranged in the housings of the exterior side mirrors, respectively.

Both the first sensors 18*a*, 18*b* are configured for providing first data D1 comprising a representation of the user 12.

The vehicle setting adjustment system 16 also comprises a second sensors.

In the example of FIG. 1, a total of six second sensors 20*a*, 20*b*, 20*c*, 20*d*, 20*e*, 20*f* are provided.

The second sensors 20*a*, 20*b*, 20*c*, 20*d*, 20*e*, 20*f* are formed as radar sensors, more precisely as ultra-wideband sensors.

The second sensors 20*a*, 20*b*, 20*c*, 20*d*, 20*e*, 20*f* are configured for providing second data D2 indicative of a location of the key element 14 for the vehicle 10.

It is noted that in other examples, the second sensors 20*a*, 20*b*, 20*c*, 20*d*, 20*e*, 20*f* may alternatively be formed as lidar sensors or image sensors. In the following, explanations will be provided in connection with radar sensors. However, the explanation also applies to other types of sensors.

The vehicle setting adjustment system 16 further comprises an actuator unit 22 configured for adjusting a vehicle setting.

In the example shown in the Figures, the actuator unit 22 comprises a driver seat positioning actuator 24. The driver seat positioning actuator 24 is configured to adjust a position of the driver seat 26 along a longitudinal direction of the vehicle 10.

It is noted that the actuator unit 22 comprising the driver seat positioning actuator 24 is purely illustrative. In other examples, the actuator unit 22 may alternatively, or additionally, comprise an airbag setting actuator, a seat belt setting actuator, a mirror setting actuator or a seat setting actuator of a different kind, e.g., a backrest actuator configured to adjust an inclination of the back rest of the driver seat 26.

Moreover, the vehicle setting adjustment system 16 comprises a data processing apparatus 28.

The data processing apparatus 28 is communicatively connected to each of the first sensors 18*a*, 18*b*, each of the second sensors 20*a*, 20*b*, 20*c*, 20*d*, 20*e*, 20*f*, and the actuator unit 22.

The data processing apparatus 28 comprises a data processing unit 30 and a data storage unit 32.

The data storage unit 32 comprises a computer-readable storage medium 34.

On the computer-readable storage medium 34 and, thus, on the data storage unit 32, there is provided a computer program 36.

The computer program 36, and, thus, also the computer-readable storage medium 34, comprise instructions which, when executed by the data processing unit 30 or, more generally, a computer, cause the data processing unit 30 or the computer to carry out a method for adjusting a vehicle setting to a user.

Consequently, the data processing unit 30 and the data storage unit 32 form means 38 for carrying out the method for adjusting a vehicle setting to a user.

A first step S1 of the method for adjusting a vehicle setting to a user comprises receiving first data D1 comprising a representation of the user 12. The first data D1 is received at the data processing apparatus 28.

Since in the present example, the user 12 is located in the field of view of the first sensor 18*a* only, the first data D1 is provided by the first sensor 18*a*. It is understood that in other situations, first sensor 18*b* may be used for providing the first data D1.

As has been explained before, the first data D1 is image sensor data.

Figure 2:
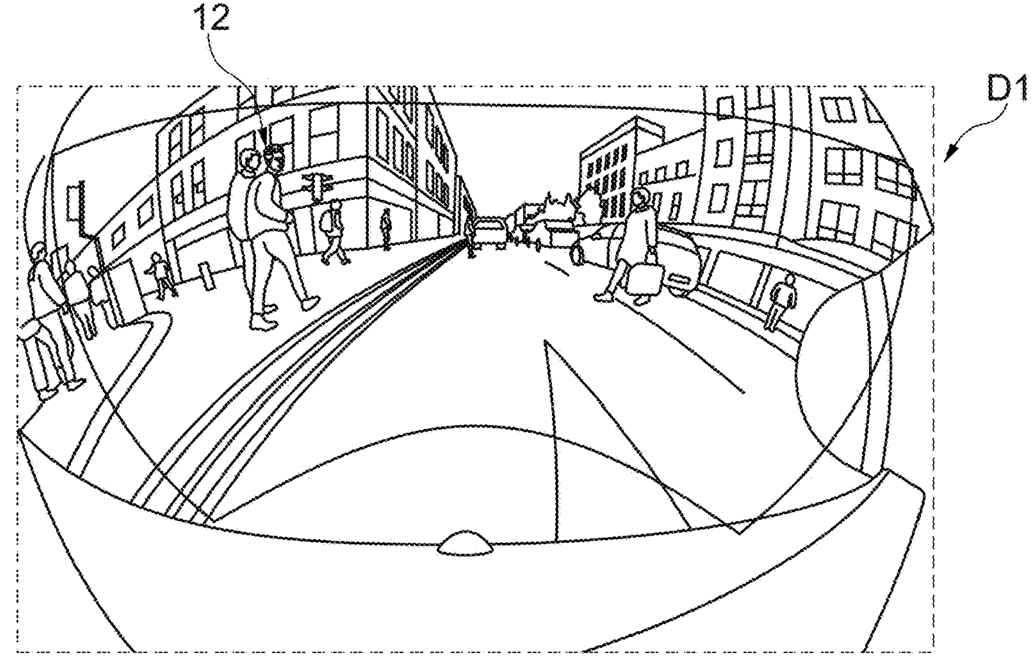
FIG. 2 shows first data comprising a representation of a user of the vehicle.

An example of first sensor data provided by the first sensor 18*a* is shown in FIG. 2. It is noted that the representation of the user 12 is indicated by reference sign 12 as well, even though strictly speaking the user and the representation of the user are different.

In a second step S2 of the method for adjusting a vehicle setting to a user, second data D2 is received.

In the present example, the second data D2 is provided by the second sensors 20*a*, 20*b*, 20*c* which are located on a driver side of the vehicle 10.

Due to the fact that the second sensors 20*a*, 20*b*, 20*c* are located at different positions on the vehicle 10, the second data D2 comprises sensor data associated with three detection positions on the vehicle 10.

More precisely, the second data D2 is formed by sensor data D2*a* provided by second sensor 20*a*, sensor data D2*b* provided by second sensor 20*b* and sensor data D2*c* provided by second sensor 20*c*.

As has been explained before, the second data D2 is indicative of a location of the key element 14.

In the present example, the sensor data D2*a* is indicative of a distance da between the key element 14 and the second sensor 20*a*. The sensor data D2*b* is indicative of a distance db between the key element 14 and the second sensor 20*b*. The sensor data D2*c* is indicative of a distance dc between the key element 14 and the second sensor 20*c*. In FIG. 1 this is illustrated by three circles having the respective second sensor 20*a*, 20*b*, 20*c* at their centers and a radius corresponding to da, db, dc, respectively.

The distance between the key element 14 and each of the second sensors 20*a*, 20*b*, 20*c* may be indicated by a signal strength received at each of the second sensors 20*a*, 20*b*, 20*c* and/or a time of flight detected by each of the second sensors 20*a*, 20*b*, 20*c*.

Since in the present examples, the second sensors 20*a*, 20*b*, 20*c*, 20*d*, 20*e*, 20*f* are radar sensors, the second data D2 comprises radar sensor data.

A third step S3 comprises identifying the representation of the user 12 in the first data D1 by mapping the second data D2 on the first data D1.

The third step S3 comprises several sub-steps.

In a first sub-step S31, the first data D1 is pre-processed. In the present example, the pre-processing comprises a rectification of the first data D1. Thus, the first data D1 is transformed from a condition as shown in FIG. 2 into a condition as shown in FIG. 3.

In a second sub-step S32, an object detection technique is applied on the first data D1, more precisely on the pre-processed first data D1. In the present example, the object detection technique is configured to detect human beings in the first data D1.

Figure 3:
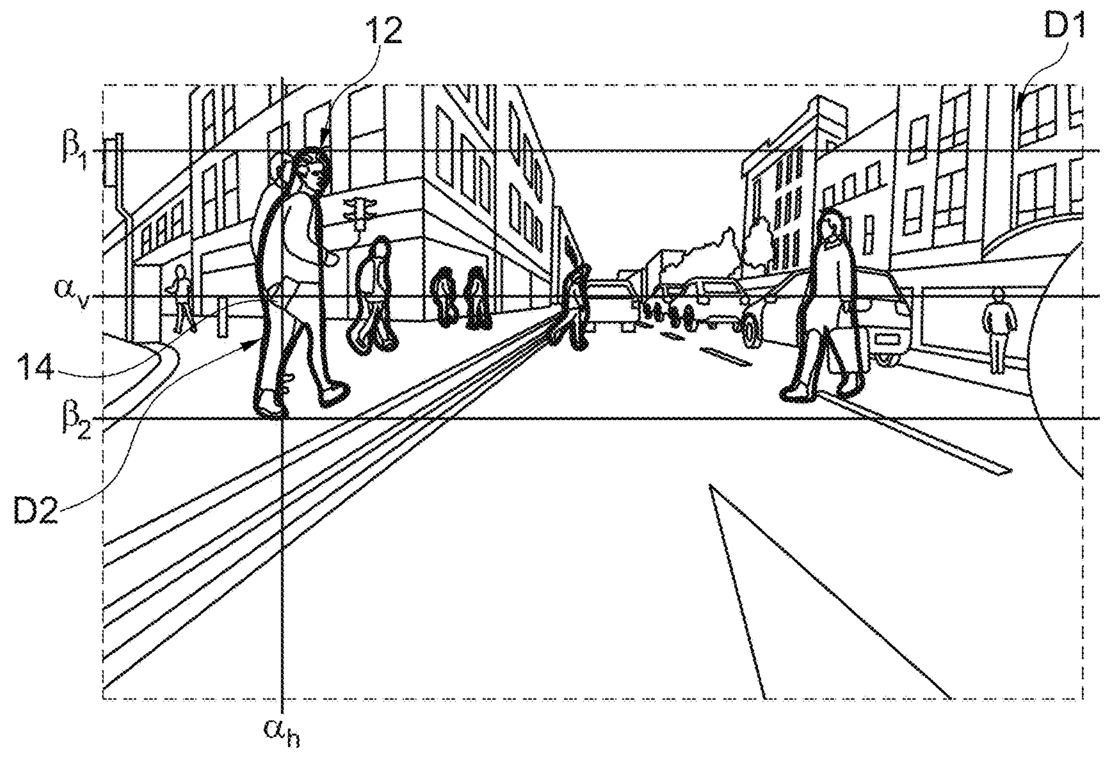
FIG. 3 shows the first data of FIG. 2 after a pre-processing step.

In order to illustrate the result of the second sub-step S32, detected human beings are highlighted by a thick line following their respective contour in FIG. 3.

In a third sub-step S33, a trilateration technique is applied on the second data D2, i.e., on the sensor data D2*a*, D2*b* and D2*c* associated with the three positions on the vehicle 10. In simplified words, a location of the key element 14 is determined based on the detected distances da, db, dc between the key element 14 and each of the second sensors 20*a*, 20*b*, 20*c*. Since the position of each of the second sensors 20*a*, 20*b*, 20*c* on the vehicle 10 is known, the location of the key element 14 relative to the vehicle 10 may be determined in three dimensions.

Thereafter, in a fourth sub-step S34, a distance d between the location of the key element 14 and the first sensor 18*a* may be calculated. This is due to the fact that a position of the first sensor 18*a* on the vehicle 10 is known. Moreover, also based on the known position of the first sensor 18*a* on the vehicle 10, a detection angle $\alpha$ defining a direction under which the key element 14 is located with respect to the first sensor 18*a* may be determined. More precisely, a vertical detection angle $\alpha_v$ and a horizontal detection angle $\alpha_h$ may be calculated (cf. FIGS. 1 and 3).

Subsequently, in a fifth sub-step S35, the location of the key element 14 may be marked in the first data D1 using the vertical detection angle $\alpha_v$ and the horizontal detection angle $\alpha_h$. This is illustrated in FIG. 3.

Based thereon, in a sixth sub-step S36, the representation of the user 12 may be identified by selecting the detected human being who is located closest to the location of the key element 14 or who has an overlap with the location of the key element 14.

In the example of FIG. 3, the leftmost human being is identified as the representation of the user 12 in the first data D1.

Consequently, in a seventh sub-step S37, at least one detection angle associated with the representation of the user 12 may be estimated based on the received second data D2 and the determined vertical detection angle $\alpha_v$ and the horizontal detection angle $\alpha_h$, the received first data D1 comprising the determined representation of the user 12 and a known position of the first sensor 18*a*.

Figure 4:
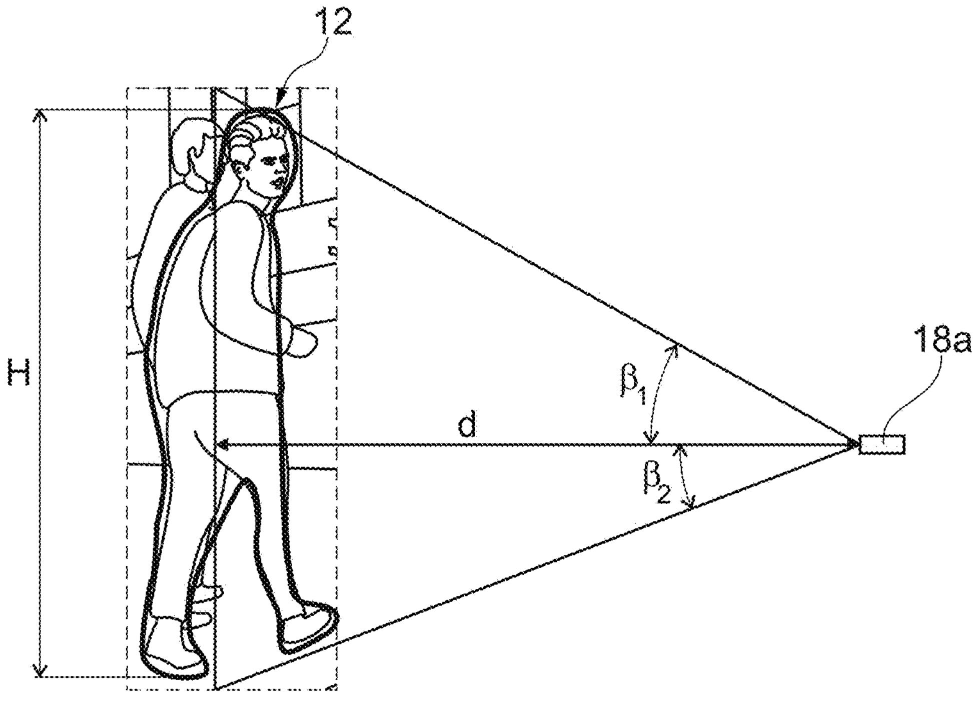
FIG. 4 illustrates determining a user characteristic based on the representation of the user of the vehicle.

This is illustrated in a simplified manner in FIG. 4, wherein just the detection angles associated with the vertical direction and denoted $\beta_1$, $\beta_2$ are shown. It is understood that detection angles associated with a horizontal direction may be determined in the same manner.

Thereafter, in a fourth step S4, a body characteristic of the user is estimated based on the identified representation of the user 12.

Referring again to FIG. 4, a full body height H of the user 12 may be determined based on the detection angles $\beta_1$, $\beta_2$ and the distance d using trigonometric operations.

Based thereon, in a fifth step S5, the adjustment of the vehicle setting is triggered based on the estimated body characteristic of the user 12, i.e., based on the estimated full body height of the user 12.

In the present example, a look-up table is provided on the data storage unit 32 of the data processing apparatus 28. The look-up table comprises a list of full body heights ranging from 1.5 m to 2.1 m. Furthermore, the look-up table comprises an appropriate position for the driver seat 26 associated with each of the full body heights of this list.

It is noted that the method for adjusting a vehicle setting to a user has been explained in connection with the body characteristic being a full body height of the user. This is purely illustrative. In other examples, the body characteristic may additionally or alternatively relate to any one or more of an upper body height of the user, a full leg length of the user, a thigh length of the user, a lower leg length of the user, or a body weight of the user. It is noted that to this end, the object detection technique needs to be configured to detect an upper body, a leg, a thigh, or a lower leg, respectively. In order to estimate a body weight, a width of the representation of the user may be determined.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B")

may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS

10 vehicle
12 user
14 key element
16 vehicle setting adjustment system
**18*a*** first sensor
**18*b*** first sensor
**20*a*** second sensor
**20*b*** second sensor
**20*c*** second sensor
**20*d*** second sensor
**20*e*** second sensor
**20*f*** second sensor
22 actuator unit
24 driver seat positioning actuator
26 driver seat
28 data processing apparatus
30 data processing unit
32 data storage unit
34 computer-readable storage medium
36 computer program
38 means for carrying out a method for adjusting a vehicle setting to a user
d distance between the key element and the first sensor
da distance between key element and second sensor **20*a***
db distance between key element and second sensor **20*b***
dc distance between key element and second sensor **20*c***
D1 first data
D2 second data
D**2*a*** sensor data
D**2*b*** sensor data
D**2*c*** sensor data
H full body height
S1 first step
S2 second step
S3 third step
S31 first sub-step
S32 second sub-step
S33 third sub-step
S34 fourth sub-step
S35 fifth sub-step
S36 sixth sub-step
S37 seventh sub-step
S4 fourth step
S5 fifth step
$\alpha$ a detection angle
$\alpha_v$ vertical detection angle associated with the key element
$\alpha_h$ horizontal detection angle associated with the key element
$\beta_1$ detection angle associated with the user
$\beta_2$ detection angle associated with the user

What is claimed is:

1. A method for adjusting a vehicle setting to a user, the method comprising:

receiving, by a system comprising a processor, first data comprising a representation of the user in an environment outside of a vehicle;

receiving, by the system, second data indicative of a location of a key element for a vehicle relative to the vehicle;

identifying, by the system, the representation of the user in the first data by mapping the second data on the first data, wherein identifying the representation of the user in the first data comprises estimating at least one detection angle associated with the representation of the user based on the second data and a relative position between a first sensor associated with the first data and a second sensor associated with the second data; and triggering, by the system, adjustment of the vehicle setting based on the representation of the user.

2. The method of claim 1, wherein the second data comprises sensor data associated with at least two detection positions on the vehicle.

3. The method of claim 2, wherein mapping the second data on the first data comprises applying a trilateration technique or a triangulation technique on the sensor data associated with the at least two detection positions on the vehicle.

4. The method of claim 1, wherein at least one of:

the second data comprises at least one of radar sensor data, lidar sensor data, or image sensor data, or the first data comprises image data.

5. The method of claim 1, wherein identifying the representation of the user in the first data comprises applying an object detection technique on the first data.

6. The method of claim 1, further comprising:

estimating, by the system, a body characteristic of the user based on the representation of the user; and triggering, by the system, adjustment of the vehicle setting based on the body characteristic.

7. The method of claim 6, wherein the body characteristic comprises at least one of:

a full body height of the user, an upper body height of the user, a full leg length of the user, a thigh length of the user, a lower leg length of the user, or a body weight of the user.

8. The method of claim 1, wherein the vehicle setting comprises at least one of an airbag setting, a seat belt setting, a seat setting, or a mirror setting.

9. A vehicle setting adjustment system, comprising:

at least one first sensor configured for providing first data comprising a representation of a user in an environment outside of a vehicle;

at least one second sensor configured for providing second data indicative of a location of a key element for the vehicle;

an actuator unit configured for adjusting a vehicle setting; and a data processing apparatus, wherein the data processing apparatus is communicatively connected to the at least one first sensor, the at least one second sensor, and the actuator unit, wherein the data processing apparatus receives the first data comprising the representation of the user, wherein the data processing apparatus receives the second data indicative of the location of the key element for the vehicle relative to the vehicle, wherein the data processing apparatus identifies the representation of the user in the first data by mapping the second data on the first data, wherein identifying the representation of the user in the first data comprises estimating at least one detection angle associated with the representation of the user based on the second data and a relative position between a first sensor of the at least one first sensor associated with the first data and a second sensor of the at least one second sensor associated with the second data, and wherein the data processing apparatus triggers adjustment of the vehicle setting based on the representation of the user.

10. The vehicle setting adjustment system of claim 9, wherein at least one of:

the at least one first sensor comprises an image sensor, or the at least one second sensor comprises at least one of a radar sensor, a lidar sensor, or an image sensor.

11. The vehicle setting adjustment system of claim 9, wherein the vehicle setting adjustment system is comprised in the vehicle.

12. The vehicle setting adjustment system of claim 9, wherein the data processing apparatus:

estimates a body characteristic of the user based on the representation of the user, and triggers adjustment of the vehicle setting based on the body characteristic.

13. The vehicle setting adjustment system of claim 12, wherein the body characteristic comprises at least one of:

a full body height of the user, an upper body height of the user, a full leg length of the user, a thigh length of the user, a lower leg length of the user, or a body weight of the user.

14. A non-transitory machine-readable medium, comprising executable instructions that, when executed by a processor, facilitate performance of operations, comprising:

receiving first data comprising a representation of a user in an environment outside of a vehicle;

receiving second data indicative of a location of a key element for the vehicle relative to the vehicle;

identifying the representation of the user in the first data by mapping the second data on the first data, wherein identifying the representation of the user in the first data comprises estimating at least one detection angle associated with the representation of the user based on the second data and a relative position between a first sensor associated with the first data and a second sensor associated with the second data; and triggering adjustment of a vehicle setting based on the representation of the user.

15. The non-transitory machine-readable medium of claim 14, wherein the second data comprises sensor data associated with at least two detection positions on the vehicle.

16. The non-transitory machine-readable medium of claim 15, wherein mapping the second data on the first data comprises applying a trilateration technique or a triangulation technique on the sensor data associated with the at least two detection positions on the vehicle.

17. The non-transitory machine-readable medium of claim 14, wherein at least one of:

the second data comprises radar sensor data, lidar sensor data, or image sensor data, or the first data comprises image data.

18. The non-transitory machine-readable medium of claim 14, wherein identifying the representation of the user in the first data comprises applying an object detection technique on the first data.

19. The non-transitory machine-readable medium of claim 14, further comprising:

estimating a body characteristic of the user based on the representation of the user; and triggering adjustment of the vehicle setting based on the body characteristic.

20. The non-transitory machine-readable medium of claim 19, wherein the body characteristic comprises at least one of:

a full body height of the user, an upper body height of the user, a full leg length of the user, a thigh length of the user, a lower leg length of the user, or a body weight of the user.

* * * * *